US011965639B2

(12) United States Patent
Wu

(10) Patent No.: US 11,965,639 B2
(45) Date of Patent: Apr. 23, 2024

(54) LIGHT SOURCE MODULE AND LIGHTING APPARATUS

(71) Applicant: Huizhou Hanxing Optoelectronic Co., Ltd, Huizhou (CN)

(72) Inventor: Hongge Wu, Huizhou (CN)

(73) Assignee: HUIZHOU HANXING OPTOELECTRONIC CO., LTD, Huizhou (CN)

( * ) Notice: Subject to any disclaimer, the term of this patent is extended or adjusted under 35 U.S.C. 154(b) by 0 days.

(21) Appl. No.: 18/144,869

(22) Filed: May 9, 2023

(65) Prior Publication Data

US 2023/0408068 A1 Dec. 21, 2023

(30) Foreign Application Priority Data

Jun. 16, 2022 (CN) ......................... 202210682528.6

(51) Int. Cl.

| | |
|---|---|
| ***F21V 15/01*** | (2006.01) |
| ***F21V 3/06*** | (2018.01) |
| ***F21V 17/12*** | (2006.01) |
| ***F21V 19/00*** | (2006.01) |
| ***F21V 23/00*** | (2015.01) |
| ***F21V 29/76*** | (2015.01) |

(52) U.S. Cl.

CPC ............ *F21V 15/01* (2013.01); *F21V 3/0625* (2018.02); *F21V 17/12* (2013.01); *F21V 19/0035* (2013.01); *F21V 23/005* (2013.01); *F21V 29/76* (2015.01)

(58) Field of Classification Search

CPC ........ F21V 15/01; F21V 3/0625; F21V 17/12; F21V 19/0035; F21V 23/005; F21V 29/76

See application file for complete search history.

(56) References Cited

U.S. PATENT DOCUMENTS

2015/0167922 A1* 6/2015 Casper .................... F21V 23/02 362/326
2015/0176823 A1* 6/2015 Leshniak ................ F21V 29/77 362/249.03

* cited by examiner

*Primary Examiner* — Anne M Hines
*Assistant Examiner* — Jose M Diaz
(74) *Attorney, Agent, or Firm* — Andrew C. Cheng

(57) ABSTRACT

A light source module provided includes a heat sink, a circuit board, a lamp shade, and a fixing member. The circuit board is provided with one side tightly attached to the heat sink, and the other side is provided with a plurality of light sources. The lamp shade is provided with a plurality of optical lenses, the plurality of the optical lenses are respectively formed by a plurality of recesses forming on a front surface of the lamp shade, and a plurality of arc protrusions corresponding to the plurality of the recess forming on a back surface of the lamp shade. The fixing member is configured to fix the lamp shade on the heat sink to receive the circuit board in a space defined by the lamp shade and heat sink. Further, a lighting apparatus is also provided.

18 Claims, 4 Drawing Sheets

LIGHT SOURCE MODULE AND LIGHTING APPARATUS

CROSS REFERENCE TO RELATED APPLICATION

This non-provisional patent application claims priority under 35 U. S. C. § 119 from Chinese Patent Application No. 202210682528.6 filed on Jun. 16, 2022, the entire content of which is incorporated herein by reference.

TECHNICAL FIELD

The disclosure relates to luminaire technologies, and in particular to a light source module and a lighting apparatus.

BACKGROUND

Outdoor lighting apparatus require high power, and further require good heat dissipation and good waterproofing. In addition, the outdoor lighting apparatus may be mounted high, so requirements of optical performance of the lighting apparatus are relatively high. However, the lenses of typical lighting apparatus are easily damaged by friction and collision during production, manufacture and transportation.

SUMMARY

The purpose of this disclosure is to provide a light source module and a lighting apparatus that are resistant to friction and not easily damaged.

At a first aspect, a light source module provided includes a heat sink, a circuit board, a lamp shade, and a fixing member. The circuit board is provided with one side tightly attached to the heat sink, and the other side is provided with a plurality of light sources. The lamp shade is provided with a plurality of optical lenses, the plurality of the optical lenses are respectively formed by a plurality of recesses forming on a front surface of the lamp shade, and a plurality of arc protrusions corresponding to the plurality of the recess forming on a back surface of the lamp shade. The fixing member is configured to fix the lamp shade on the heat sink to receive the circuit board in a space defined by the lamp shade and heat sink.

At a second aspect, a lighting apparatus provided includes a lamp holder and a plurality of light source modules fixed in the lamp holder. The light source module includes a heat sink, a circuit board, a lamp shade, and a fixing member. The circuit board is provided with one side tightly attached to the heat sink, and the other side is provided with a plurality of light sources. The lamp shade is provided with a plurality of optical lenses, the plurality of the optical lenses are respectively formed by a plurality of recesses forming on a front surface of the lamp shade, and a plurality of arc protrusions corresponding to the plurality of the recess forming on a back surface of the lamp shade. The fixing member is configured to fix the lamp shade on the heat sink to receive the circuit board in a space defined by the lamp shade and heat sink.

In this disclosure, the lens on the lamp shade protrudes inward, the position where the lens is concaved, so that the lens is not easily rubbed and collided during production, manufacturing, and transportation. During use, it is not easy to be collided with substances blown by strong winds, and ensures that the light source module has good optical performance within an expected validity period.

BRIEF DESCRIPTION OF THE DRAWINGS

In order to illustrate the technical solution in the embodiments of the disclosure or the prior art more clearly, a brief description of drawings required in the embodiments or the prior art is given below. Obviously, the drawings described below are only some of the embodiments of the disclosure. For ordinary technicians in this field, other drawings can be obtained according to the structures shown in these drawings without any creative effort.

DETAILED DESCRIPTION OF THE EMBODIMENTS

In order to make purpose, technical solution and advantages of the disclosure more clearly, the disclosure is further described in detail in combination with drawings and embodiments. It is understood that the specific embodiments described herein are used only to explain the disclosure and are not used to define it. On the basis of the embodiments in the disclosure, all other embodiments obtained by ordinary technicians in this field without any creative effort are covered by protection of the disclosure.

Terms "first", "second", "third", "fourth", if any, in specification, claims and drawings of this application are used to distinguish similar objects and need not be used to describe any particular order or sequence of priorities. It should be understood that data are interchangeable when appropriate, in other words, the embodiments described can be implemented in order other than what is illustrated or described here. In addition, terms "include" and "have" and any variation of them, can encompass other things. For example, processes, methods, systems, products, or equipment that comprise a series of steps or units need not be limited to those clearly listed, but may include other steps or units that are not clearly listed or are inherent to these processes, methods, systems, products, or equipment.

It is to be noted that description refers to "first", "second", etc. In the disclosure are for descriptive purpose only and neither be construed or implied relative importance nor indicated as implying number of technical features. Thus, feature defined as "first" or "second" can explicitly or implicitly include one or more features. In addition, technical solutions between embodiments may be integrated, but only on the basis that they can be implemented by ordinary technicians in this field. When the combination of technical solutions is contradictory or impossible to be realized, such combination of technical solutions shall be deemed to be non-existent and not within the scope of protection required by the disclosure.

Figure 1:
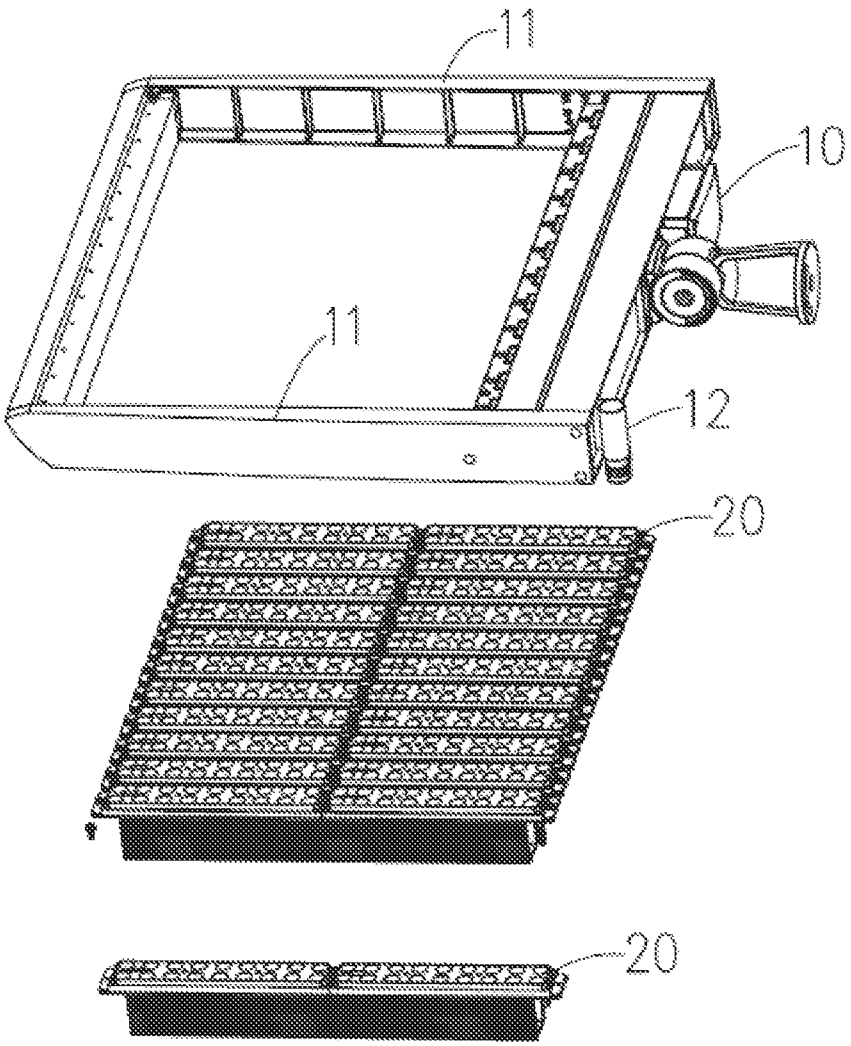
FIG. 1 illustrates an exploded view of a lighting apparatus in accordance with an embodiment.

Referring to FIG. 1, a lighting apparatus is illustrated. The lighting apparatus 100 includes a lamp holder 10, and at least one light source module 20 located inside the lamp holder 10. In this embodiment, the lighting apparatus 100 includes twelve light source modules 20. The light source module 20 is module and can be mounted in the holder 10 and stood side-by-side between two fixed arms 11 of the lamp holder 10. The lighting apparatus may have different sizes and powers can due to different quantities of light source modules 20. A structure and functions of the light source module 20 are described in detail below. For easily understood, it is defined that a side of the light source module facing a light output direction is front side, and the side turning away from the light output direction is back/rear side.

Figure 2:
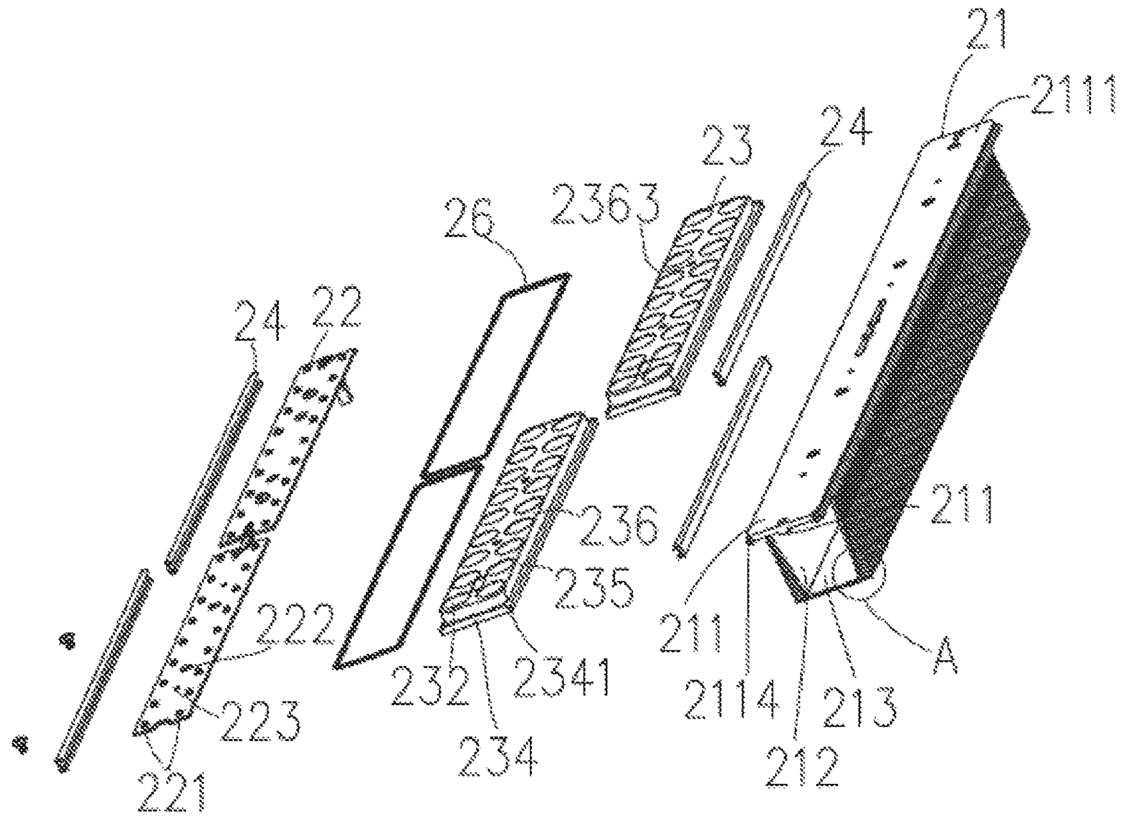
FIG. 2 illustrates an exploded view of a light source module in accordance with an embodiment.
Figure 3:
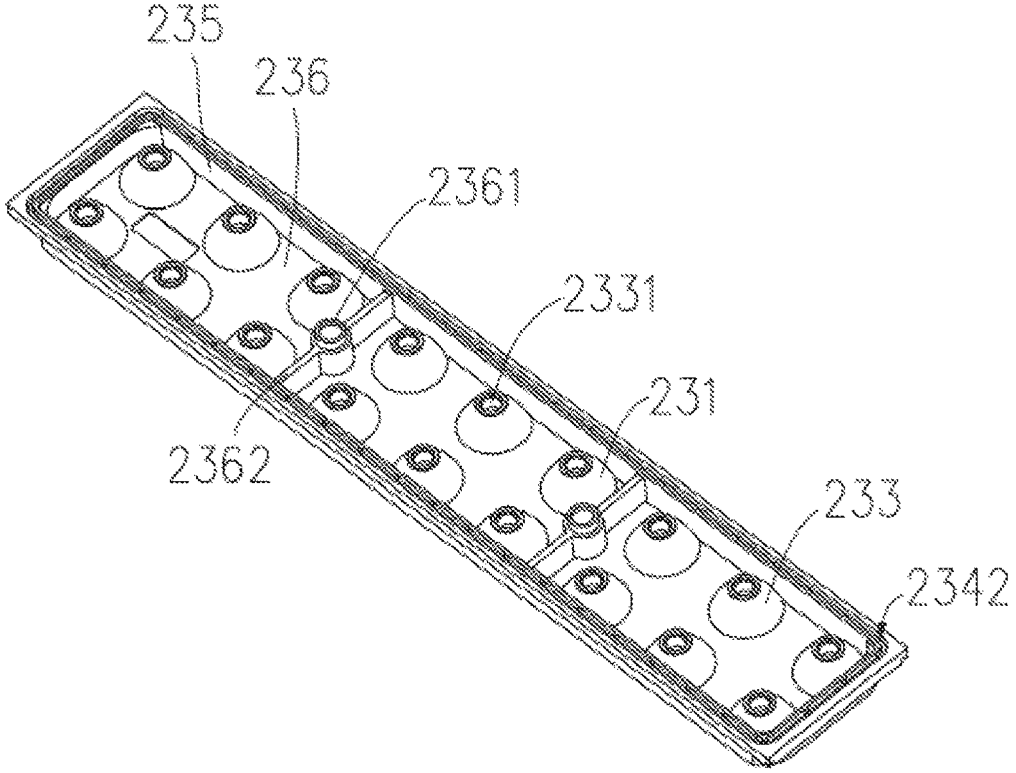
FIG. 3 illustrates a perspective view of a lighting cap of the light source shown in FIG. 2.
Figure 4:
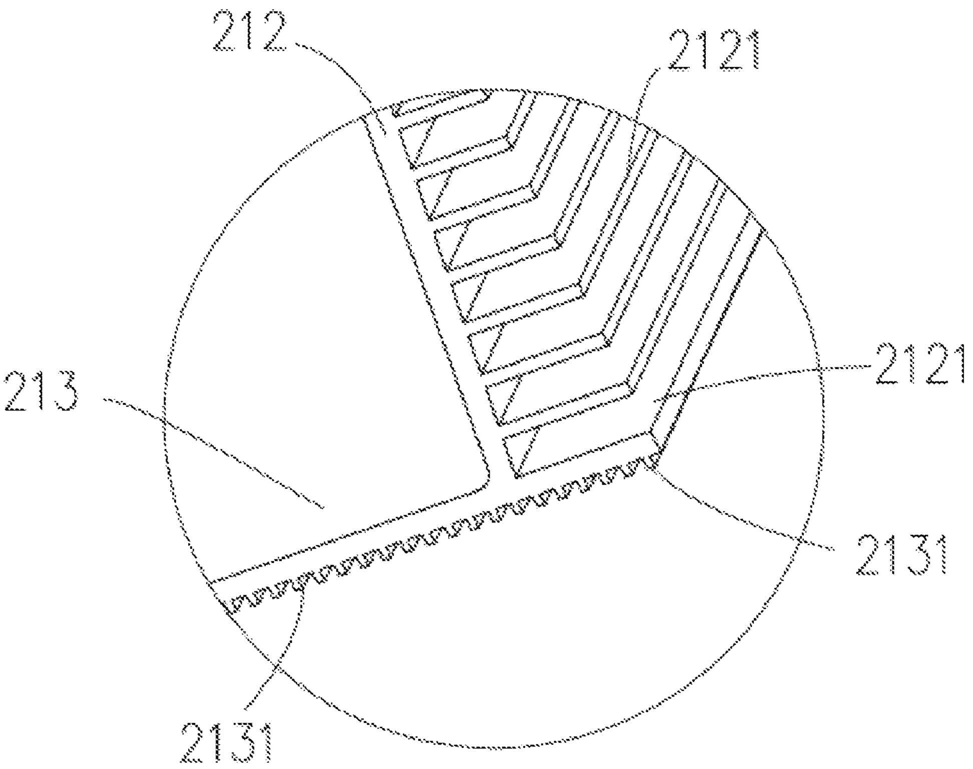
FIG. 4 illustrates an enlarged view of a potion labeled A of the light source module shown in FIG. 2.

Referring to FIGS. 2-4, the light source module 20 includes a heat sink 21, a circuit board 22 with one side attached closely to the heat sink 21, a lamp shade 23, and a fixing member 24. The fixing member 24 is connected to the heat sink 21 that a uniform force is applied to two sides of the lamp shade 23 to press the heat sink 21, and the circuit board 22 is sealed between lamp shade 23 and the heat sink 21.

One side/a back side of the circuit board 22 is attached closely to the heat sink 21, and a plurality of light sources 221 are arranged on the other side/a front side. LED light sources are taken as an example. The circuit board 22 is substantially rectangular, a width and a length of the circuit board are smaller than a width and a length of the heat sink 21 surface. The circuit board 22 has a set of first holes 222 near the inside and a set of second holes 223 near the outside.

The lamp shade 23 is made of transparent PC material with stable chemical properties. In a first aspect, the lamp shade 23 serves as the protective cover and sealing cover of the circuit board 22, and in a second aspect, the lamp shade 23 serves as an optical processing component of light source 221. There are a plurality of optical lens 231 provided by the lamp shade 23 corresponding to light source 221 on the circuit board 22 to achieve specific lighting effects.

Specifically, a front side of the lamp shade 23 defines a plurality of recesses 232 and a back side opposite to the front side protrudes a plurality of arc protrusions 233 corresponding to the recesses 232 respectively. One contrasting recesses 232 and one corresponding arc protrusions 233 form one optical lens 231 of the light source module 20. That is, the lens 231 protrudes inwardly. Locations of the surface/the front side of the lamp shade 23 where the lens is formed are concave, So that the lens is not easily rubbed and collided during production, manufacturing, and transportation. During the lamp shade 23 are using, it is not easy to be hit by substances blown by strong winds, which can ensure that the light source module 20 has good optical performance within an expected validity period.

In this embodiment, lamp shade 23 include a base plate 234 in a square frame shape, a guard wall 235 integrally extended from an inner periphery of the base plate 234, and a top plate 236 covering an end of the guard wall 235. That is, the lamp shade 23 is a cover with flange. In this way, the lens 231 formed on the inner side could be better protected, and lights generated by the light source 221 could be emitted from the lamp shade 23 as much as possible, thus improving the use efficiency of the light source 221. A width and a length of the inner periphery of the base plate 234 are greater than a width and a length of the circuit board 22, and the circuit board 22 can be limited to the inside of base plate 234.

In this embodiment, the plurality of recesses 232 are formed on a front side of the top plate 236. Each recesses 232 is rounded and has a smooth bottom. The recesses 232 has a depth of 0.1 mm to 3 mm. The plurality of the arc protrusions 233 formed on the back of the top plate 236 are generally in a cone-like shape. Heights of the arc protrusions is lower than heights of the guard wall 235 protruding out of the back of the top plate 236. As a result, the walls around the recesses 232 are not too high to affect light emitted and to prevent the surfaces of the lens from friction.

In this embodiment, the arc protrusion 233 in a truncated cone shape further defines a hole not through the top plate 236, that allows the light beam emitted by the light source module 20 to have good directionality and contraction. Even if the lighting apparatus are mounted high, the light fell on the ground by the light source module 20 can still meet the requirements.

In addition, the back side of the top plate 236 protrudes at least two columns 2361. Strengthening ribs 2362 extend from both sides of the column 2361 toward to the guard wall 235 until connect to the guard wall 235. Each strengthening rib 2362 is parallel to the short side of the guard wall 235. The strengthening rib 2362 increase the strength of the lamp shade 23. The end of the column 2361 is inserted into the first hole 222 of the circuit board 22. The first hole 222 is not a through-hole, so the end of the column 2361 is supported by the circuit board 22. In this way, the mechanical properties of the top plate 236 are increased. The strengthening rib 2362 and column 2361 make lamp shade 23 hard to cracking due to stress concentration.

In this embodiment, the front side of the top plate 236 facing to the columns 2361 defines holes 2363 that does not penetrate the top plate 236 or the columns 2361. The holes 2363 serves as reserved holes to conveniently fix other components on the lamp shade 23 for later assembly, such as fixing the light shield with screws to guide emission directions of the lights.

The back of the base plate 234 defines an annual groove 2342 to fix the seal ring 26. In this way, water vapor can be prevented from entering into spaces where the circuit board 22 is located through a gap at a junction of lamp shade 23 and heat sink 21. Therefore a good waterproof performance is realized. The edge of the long side of the front side of the base plate 234 defines concave grooves or steps 2341 from up to bottom. Preferably, the concave grooves or steps 2341 penetrates one end of the long side and does not penetrate the other end of the long side to achieve limiting.

The heat sink 21 has a flat fixing surface 2111. In this embodiment, the heat sink 21 mainly is made of a bent aluminum profile, and includes a rectangular first heat transfer plate 211 with the fixing surface 2111, two second heat transfer plates 212 extending from two sides of a lower surface of the first heat transfer plate 211 or near the two sides, a third heat transfer plate 213 connected with ends of the two second heat transfer plates 212. The first heat transfer plate 211, the second heat transfer plates 212 and the third heat transfer plate 213 are in rectangular plate shape. A width of the third heat transfer plate 213 is smaller than a width of the first heat transfer plate 211. In detail, the third heat transfer plate 213 is parallel to the first heat transfer plate 211. A plurality of first first fins 1212 extending from the second heat transfer plate 212 are parallel to the first heat transfer plate 211. A height of the first fin 1212 is higher and higher while the first first fin 1212 is further and further away from the first heat transfer plate 211. Viewed from a back of the third heat transfer plate 213 (in other word, viewed from a direction perpendicular to the first heat transfer plate 211 and the third heat transfer plate 213), An end of the first fin 1212 is located in a plane perpendicular to the first transfer plate 213. In this embodiment, the end of the fin 2121 is flush with a long side of the first heat transfer plate 211. As a result, it is not easy to accumulate dust on other fins 2121 except for the fin 2121 on the last side. Moreover, given a premise that an internal space of the heat sink 21 is large enough, (which can be suitable to fix power module), the area of the first fin 1212 can be enlarged as large as possible, increasing a heat dissipation effect of heat sink 21, so that heat sink 21 can be adapted to light source 20 of various powers.

Further, a plurality of second fin 2131 extend from a back of the third heat transfer plate 213 and one first fin 2121 and the third heat transfer plate 213 are located in one plane, and further protrudes third fins 2123 parallel to the second fin 2131. The second fin 2131 is perpendicular to the third heat transfer plate 213. And the height of the second fin 2131 is relatively low, so it is not easy to hide dirt, and large dirt is not easy to be stuck between the second fins 2131, the accumulation of dust is easy to be washed clean by the rain.

When assembling the multiple light source modules 221, gaps are form between each two the light source modules 20. Each gap forms a convection groove between different light source modules 20 that allows air to enter into the second heat transfer plate 212, so that a chimney effect of hot air going out and cold air coming in is generated to make the heat remove from the second heat transfer plate 212 and the third heat transfer plate 213, and it improves the heat dissipation effect.

Furthermore, the lengths of the second heat transfer plate 212 and the third heat transfer plate 213 are smaller than the first heat transfer plate 211. Viewed from a bottom surface of the first heat transfer plate 211 perpendicularly, the third heat transfer plate 213 covers a part of the first heat transfer plate 211 and makes the two ends of the first heat transfer plate 211 extend out of the heat sink 21. There are line holes and fixing holes on the first heat transfer plate 211, so that the lines drawn from the the circuit board 22 can be penetrated to the back side of the first heat transfer plate 211 through the line holes. The circuit board 22 can be fastened to the heat sink 21 by screws engaged the fixing holes, so that the back of the circuit board 22 is in tightly contact with the heat sink 21, to ensure the thermal conductivity effect.

The back side of the first heat transfer plate 211 is provided with a convex rib 2112, parallel to the long side of the first heat transfer plate 211. The first heat transfer plate 211 defines a plurality of fixing holes that do not penetrate the first heat transfer plate 211. That is the fixing holes are blind holes. The fixing holes are opposite to the convex rib 2112. As a result, it can ensure that sealing performance of the light source module 20, and strength of the heat sink 21 can be increased.

The two side walls of the first heat transfer plate 211 as the long side are provided with a sliding slot 2114 running through the long side. In detail, the sliding slot 2114 is recessed from one side wall of the first heat transfer plate 211 towards the opposite side wall, and runs through the whole side wall along the long side of the first heat transfer plate 211.

In this embodiment, the lamp shade 23 and the heat sink 21 are fixed together by fixing members 24 instead of screws or other fastening members. The fixing member 24 is configured to connect the heat sink 21 by pressing the lamp shade 23 against the heat sink 21 in a manner that the two long sides of the lamp shade 23 are stressed evenly. In this embodiment, the fixing member 24 includes two opposite sliding members, each sliding member includes a long strip base board and two sliding rails extended from the two long edges of the base board. The two sliding rails are opposite to each other to form a claw. One sliding rail is inserted into the sliding slot 2114 on the side wall of the first heat transfer plate 211, and the other sliding rail is inserted into one groove or one step 2341 of the lamp shade 23 and pressed from top to bottom with relative to the groove or step 2341. As a result, the two long sides of the lamp shade 23 are pressed against the heat sink 21 in a manner of uniform processing forces.

The light source module 20 described above can seal the circuit board 2223 in the space surrounded by the lamp shade 23 and the heat sink 21 due to the waterproof rubber ring 26 arranged in the inner side of the lower slot 2342, the wire hole defined in the heat sink 21, and the waterproof rubber seat or other seals or colloids in the fixing holes. Further, the lamp shade 23 is fastened to the heat sink 21 in a manner of applied uniform pressure force on long sides, it is not easy to crack even if it becomes brittle due to exposure to alkaline conditions, ensures service performance. The strengthening rib 2362 and the column 2361 are located on the lamp shade 23 to increase the overall strength of the lamp shade 23, so that the pressure forces applied to the lamp shade 23 was uniform and a phenomenon of stress concentration does not easy occur.

In the above embodiment, the two circuit board 22 and the two lamp shade 23 are mounted on each heat sink 21. It is understood that in other embodiments, there are only one circuit board 22 and one lamp shade 23, or there are one lamp shade 23 can receive two or more circuit board 22. Of course, the light source module 20 can be further expanded according to the requirements, just by adjusting the size of the heat sink 21. Further, in other deformation embodiment, three or more circuit board 22 and lamp shade 23 can be mounted on each heat sink 21.

In other embodiments, the lamp shade 23 may be fixed to the heat sink 21 by other fixing members, such as screws.

In the above embodiments, a length of the fixing member 24 is substantially the same as that of the long side of the first heat transfer plate 211 of the heat sink 21, so the long side of the lamp shade 23 is stressed evenly. It is understood that in other embodiments the fixing member may include independent segments to replace the integrated fixing member. Alternatively, the lamp shade 23 and the heat sink 21 can be connected by tightening the edges of the lamp shade 23 and the first heat transfer plate 211 directly using clamps. Understandably, the screw or other fixing members above can be a pad or gasket. And a surface of the pad or the gasket contacted with a mounting surface is an optimize mounting surface, thus it increases the connection strength.

In addition, the lamp holder 10 has an optical sight device 12 for determining an illumination direction of the lighting apparatus. When installing the lighting apparatus, you can determine the angle of the lighting apparatus by the optical sight device 12 to ensure the accuracy of the lighting apparatus installation. The optical sight device 12 can be secured to the periphery of the lamp holder 10 by a cylindrical fixing member, or the optical sight device 12 can be secured via a mounting hole in the lamp holder 10.

Figure 5:
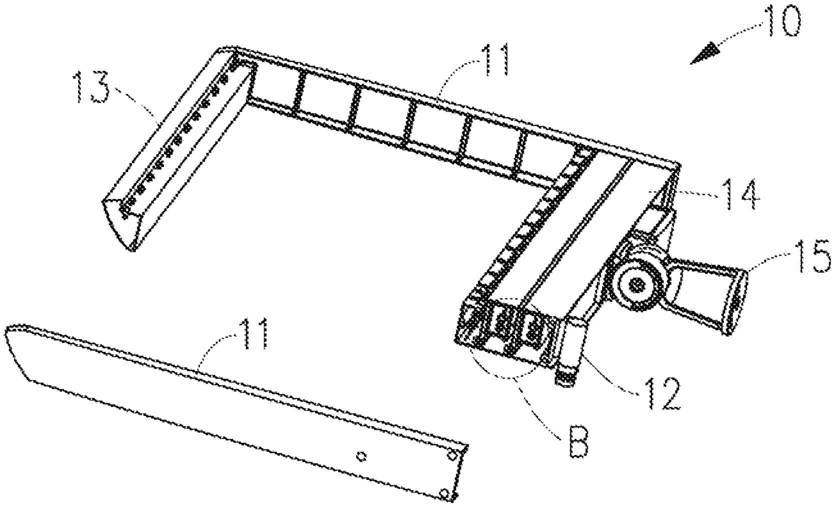
FIG. 5 illustrates a exploded view of a part of the lamp holder in accordance with an embodiment.
Figure 6:
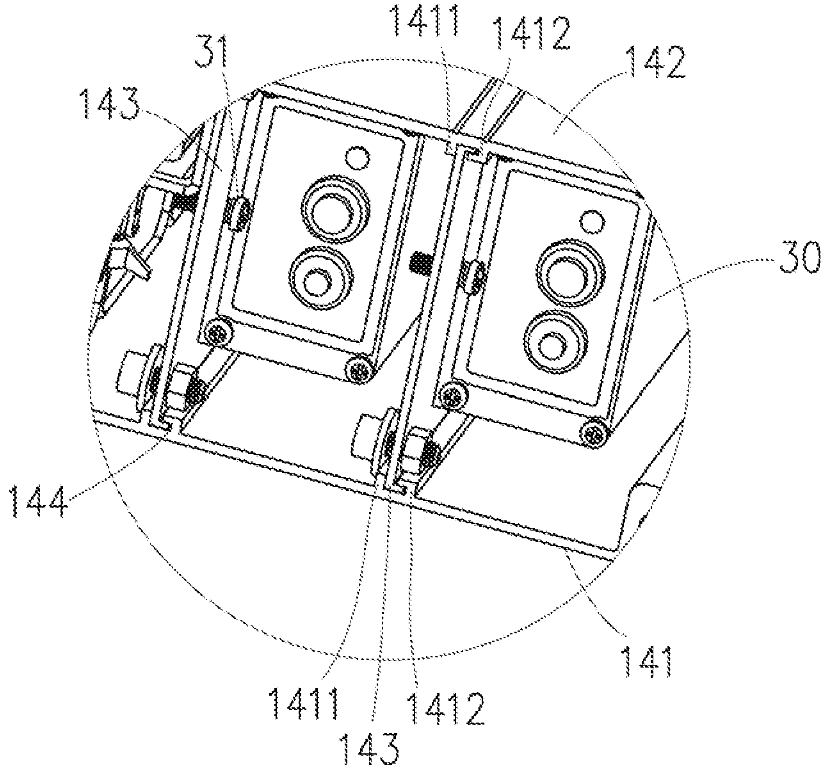
FIG. 6 illustrates an enlarged view of a potion labeled B of the lamp holder shown in FIG. 5.

Referring to FIG. 5 and FIG. 6, in this embodiment, the lamp holder 10 of the lighting apparatus is made of metal/alloy material with good thermal conductivity, such as aluminum or aluminum alloy. Two fixing arms 11 of the lamp holder 10 form a bridge connection between a front fixing part 13 and a rear fixing part 14 respectively. The front fixing part 13 and the rear fixing part 14 include both include steps, to fix to two ends of the light source module 20. The rear fixing part 14 includes a rotatable lamp arm 15, an angle between the lighting apparatus 100 and the lamp arm 15 to be adjusted to be suitable for lamp posts of different heights.

Further, the rear fixing part 14 is a hollow profile, includes a front plate 141, a rear plate 142 and a fixing plate 143 inserted between the front plate 141 and the rear plate 142. A side of the front plate 141 towards the rear plate 142 defines a slot 144 extended along an extrusion direction of the profile. The slot 144 includes a vertical wall 1411 and a L-shaped bent wall 1412, the bent wall 1412 includes a part parallel to the vertical wall 1411 and perpendicular to the front plate 141, and the other part extending towards the vertical wall 1411. And there is a gap between an end of the bent wall 1412 and the vertical wall 1411. Correspondingly, a side of the rear plate 142 facing the front plate 141 also provided with a slot 144 formed by a vertical wall 1411 and a L-shaped bent wall 1412. The fixing plate 143 includes a rectangular shaped base board and a bent edge formed on both sides of the base board, the bent edge is perpendicular to the base board and matches the bent wall 1412. Therefore, the bent edge of the fixing plate 143 can be inserted into the slot 144 formed by the front plate 141 and the rear plate 142 that the fixing plate 143 is detachably fixed to the front plate 141 and the rear plate 142. The fixing plate 143 is made of metal or metal alloy with a good thermal conductivity. In this embodiment, the fixing plate 143 is made of aluminum alloy profile that it is convenient and fast to manufacture, and has a stable structure.

The power module 30 of the lighting apparatus is fastened to the fixing plate 143 by fixing members, such as screw 31, and the surface of the power module 30 is closely attached to the fixing plate 143. Therefore, the heat of power module 30 can be efficiently transferred to the fixing plate 143. Then, the heat is transmitted to the rear fixing part 14 through the fixing plate 143, which makes the whole lamp holder can be used as the heat dissipation structure of power module 30, and improving the service life of the power module 30.

In addition, the power module 30 is provided with a fin to enable heat generated by the power module 30 to be dissipated to the rear fixing part 14. Therefore, it accelerates the heat dissipation efficiency by conducting air heat to the rear fixing part 14.

Although the description of this disclosure is made in combination with the above specific embodiments, it is obvious that personnel familiar with this technical field can make many substitutions, modifications and changes according to the above contents. Therefore, all such substitutions, improvements and changes are included in the spirit and scope of the appended claims.

The invention claimed is:

1. A light source module, comprising:

a heat sink;

a circuit board, with one side tightly attached to the heat sink, and the other side provided with a plurality of light sources;

a lamp shade, provided with a plurality of optical lenses, the plurality of the optical lenses being formed by a plurality of recesses forming on a front surface of the lamp shade, and a plurality of arc protrusions corresponding to the plurality of the recess forming on a back surface of the lamp shade; and a fixing member, configured to fix the lamp shade on the heat sink to receive the circuit board in a space defined by the lamp shade and heat sink;

wherein the heat sink comprises:

a first heat transfer plate, attached to a bottom surface of the circuit board;

two second heat transfer plate, extending from two sides of the bottom surface of the first heat transfer plate or adjacent to the two sides of the first heat transfer plate; and a third heat transfer plate, connected with ends of the two second heat transfer plates.

2. The light source module of claim 1, wherein the lamp shade comprises:

a base plates in a quare frame shape, having a concave groove or step formed on a long edge of a front side of the base plate from top to bottom, and an annular groove defining on a hack side of the base plate to fix a sealing ring;

a guard wall, extending upward from an inner circumferential side of the base plate; and a top plate, covered on an end of the guard wall away from the base plate, the plurality of recesses are formed on the front face of the top plate, a bottom of each recess being smooth and circular, a depth of each recess is range from 0.1 mm to 3 mm; the plurality of the arc protrusions protruding from a back of the top plate and being in a truncated cone shape; and a height of the arc protrusions from the back of the top plate is smaller than that of the guard wall protruding from the back of the top plate.

3. The light source module of claim 2, wherein the back side of the top plate comprises at least two columns and strengthening ribs extending from both sides of the column toward the guard wall until the strengthening ribs connect to the guard wall.

4. The light source module of claim 3, wherein the front side of the top plate defines blind holes corresponding to the columns respectively.

5. The light source module of claim 2, wherein each of the arc protrusions defines a blind hole.

6. The light source module of claim 1, wherein the first heat transfer plate, the second heat transfer plate and the third heat transfer plate are rectangular plate shape, a width of the third heat transfer plate is smaller than a width of the first heat transfer plate.

7. The light source module of claim 1, wherein the first heat transfer plate comprises a plurality of first fins extending from the second heat transfer plate, are parallel to the first heat transfer plate; a height of one first fin is higher than that of another first fin coming farther away from the first heat transfer plate; viewed from a back of the third heat transfer plate, the end of each first fin is located in a plane perpendicular to the first heat transfer plate.

8. The light source module of claim 7, wherein the third heat transfer plate comprises a plurality of second fins, extending from a back of the third heat transfer plate; the first fin adjacent to the third heat transfer plate further extending second fins.

9. The light source module of claim 1, wherein the back of the first heat transfer plate is also provided with a convex rib, and the first heat transfer plate is provided with a plurality of blind fixing holes, and the fixing holes are arranged opposite to the convex rib.

10. A lighting apparatus, comprising:

a lamp holder, and a plurality of light source modules fixed in the lamp holder, the light source module comprising:

a heat sink;

a circuit board, with one side tightly attached to the heat sink, and the other side provided with a plurality of light sources;

a lamp shade, provided with a plurality of optical lenses, the plurality of the optical lenses being formed by a plurality of recesses forming on a front surface of the lamp shade, and a plurality of arc protrusions corresponding to the plurality of the recess forming on a back surface of the lamp shade; and a fixing member, configured to fix the lamp shade on the heat sink to receive the circuit board in a space defined by the lamp shade and heat sink;

wherein the heat sink comprises:

a first heat transfer plate, attached to a bottom surface of the circuit board;

two second heat transfer plate, extending from two sides of the bottom surface of the first heat transfer plate or adjacent to the two sides of the first heat transfer plate; and a third heat transfer plate, connected with ends of the two second heat transfer plates.

11. The lighting apparatus of claim 8, wherein the lamp shade comprises:

a base plates in a quare frame shape, having concave grooves or steps formed on a long edge of a front side of the base plate from top to bottom, and an annular groove defining on a back side of the base plate to fix a sealing ring;

a guard wall, extending upward from an inner circumferential side of the base plate; and a top plate, covered on an end of the guard wall away from the base plate, the plurality of recesses are formed on the front face of the top plate, a bottom of each recess being smooth and circular, a depth of each recess is range from 0.1 mm to 3 mm; the plurality of the arc protrusions protruding from a back of the top plate and being in a truncated cone shape; and a height of the arc protrusions from the back of the top plate is smaller than that of the guard wall protruding from the back of the top plate.

12. The lighting apparatus of claim 11, wherein the back side of the top plate comprises at least two columns and strengthening ribs extending from both sides of the column toward the guard wall until the strengthening ribs connect to the guard wall.

13. The lighting apparatus of claim 12, wherein the front side of the top plate and the column relative position is formed without through the top plate or column hole.

14. The lighting apparatus of claim 11, wherein each of the arc protrusion defines a blind hole.

15. The lighting apparatus of claim 10, wherein the second heat transfer plate and the third heat transfer plate are rectangular plate shape, a width of the third heat transfer plate is smaller than a width of the first heat transfer plate.

16. The lighting apparatus of claim 10, wherein the first heat transfer plate comprises a plurality of first fins extending from the second heat transfer plate, are parallel to the first heat transfer plate; a height of one first fin is higher than that of another first fin coming farther away from the first heat transfer plate; viewed from a back of the third heat transfer plate, the end of each first fin is located in a plane perpendicular to the first heat transfer plate.

17. The lighting apparatus of claim 16, wherein the third heat transfer plate comprises a plurality of second fins, extending from a back of the third heat transfer plate; the first fin adjacent to the third heat transfer plate further extending second fins.

18. The modular lighting apparatus of claim 10, wherein the lamp holder is fixed with an optical sight device for determining the illumination direction of the lighting apparatus.

* * * * *